US010850461B2

(12) United States Patent
Bruce et al.

(10) Patent No.: US 10,850,461 B2
(45) Date of Patent: Dec. 1, 2020

(54) METHOD OF MANUFACTURING CONTACT LENSES (71) Applicant: CooperVision International Holding Company, LP, St. Michael (BB)

(72) Inventors: Ian Bruce, Southampton (GB); Adam Fieldhouse, Limerick (IE)

(73) Assignee: COOPERVISION INTERNATIONAL HOLDING COMPANY, LP, St. Michael (BB)

( * ) Notice: Subject to any disclaimer, the term of this patent is extended or adjusted under 35 U.S.C. 154(b) by 151 days.

(21) Appl. No.: 15/709,499

(22) Filed: Sep. 20, 2017

(65) Prior Publication Data
US 2018/0086013 A1    Mar. 29, 2018

Related U.S. Application Data (60) Provisional application No. 62/400,156, filed on Sep. 27, 2016.

(51) Int. Cl.
| B29D 11/00 | (2006.01) |
| B29C 48/08 | (2019.01) |
| B29C 48/00 | (2019.01) |
| G02B 1/04  | (2006.01) |

(52) U.S. Cl.
CPC .... B29D 11/00067 (2013.01); B29C 48/0018 (2019.02); B29C 48/08 (2019.02); B29D 11/00038 (2013.01); B29D 11/00826 (2013.01); G02B 1/043 (2013.01)

(58) Field of Classification Search
CPC .................................. B29D 11/00817–00826
See application file for complete search history.

(56) References Cited

U.S. PATENT DOCUMENTS

| 5,779,756 A * | 7/1998 | Chiquet ............ C03B 37/01268 65/145 |
| 2006/0001184 A1* | 1/2006 | Phelan ............. B29D 11/00038 264/1.32 |
| 2007/0132949 A1 | 6/2007 | Phelan |
| 2010/0110372 A1 | 5/2010 | Pugh et al. |
| 2014/0300012 A1 | 10/2014 | Pasternak et al. |
| 2015/0145155 A1 | 5/2015 | Pugh et al. |

(Continued)

FOREIGN PATENT DOCUMENTS

JP    S6210603 A    1/1987

OTHER PUBLICATIONS

International Search Report and Written Opinion issued in corresponding International Patent Application No. PCT/GB2017/052875 dated Jan. 3, 2018 (15 pages).

(Continued)

*Primary Examiner* — Lisa L Herring
(74) *Attorney, Agent, or Firm* — Kilyk & Bowersox, P.L.L.C.

(57) ABSTRACT

A method of manufacturing a contact lens 110 is disclosed. The method comprises manufacturing a rod of lens material 101, the rod 101 containing a plurality of electronic components 102 spaced apart along its length, separating the rod 101 into a plurality of lens blanks 106, each lens blank 106 containing at least one of said electronic components 102, and machining the front and/or back surface of a lens blank 106 to produce a contact lens 110 containing the at least one electronic component 102.

8 Claims, 4 Drawing Sheets (56) References Cited

U.S. PATENT DOCUMENTS

2016/0114172 A1    4/2016  Loudin et al.
2017/0368723 A1   12/2017  Fäecke et al.
2017/0371180 A1*  12/2017  Harant ................... B29D 11/00

OTHER PUBLICATIONS

International Preliminary Report on Patentability issued in corresponding International Patent Application No. PCT/GB2017/052875 dated Dec. 17, 2018 (13 pages).

Office Action received in corresponding Japanese Patent Application No. 2019-515588 dated Dec. 16, 2019 with English translation (7 pages).

* cited by examiner

METHOD OF MANUFACTURING CONTACT LENSES

The present invention claims priority to U.S. Provisional Patent Application No. 62/400,156 filed Sep. 27, 2016, and is incorporated in its entirety by reference herein.

FIELD

This invention relates to the field of contact lens manufacture. In particular, but not exclusively, the invention provides methods for manufacturing contact lenses containing electronic components.

BACKGROUND

Various methods of manufacturing contact lenses are known, including spin casting, lathing (for example by diamond turning), and cast molding (for example, using injection molded mold halves). In a typical lathing process a rod of lens material is formed. The rod is then cut to form lens blanks. The lens blanks are then placed on a lathe and the back and front surfaces are machined to produce a contact lens having the required profile. While this type of lathing process was initially widely adopted by contact lens manufacturers, improvements in cast molding processes have led to a move away from lathing in recent years, and cast molding has become the main process for manufacturing contact lenses. Some contact lenses, for example made-to-order contact lenses, which are produced in relatively small batches, typically for patients requiring relatively unusual prescriptions, are made by a hybrid process, in which a lens blank is cast molded with a desired back or front surface and the other, front or back, surface is then machined to produce the required profile.

Recent advances in microelectronics have led to renewed interest in the idea of incorporating electronic components, particularly microelectronic components or Microelectromechanical Systems (MEMS) into contact lenses. However, there is a need to identify manufacturing processes that allow electronic components to be incorporated into contact lenses in a manner that is practical for mass manufacture on a commercial basis. In particular, there remains a need for mass manufacturing processes that allow for the cost effective and reliable production of contact lenses incorporating electronic components in large quantities.

SUMMARY

Briefly and in general terms, the present invention provides methods and apparatus directed towards improved methods of manufacturing contact lenses including electronic components.

This invention provides, in a first aspect, a method of manufacturing a contact lens, the method comprising manufacturing a rod of lens material, the rod containing a plurality of electronic components spaced apart along its length, separating the rod into at least one lens blank containing at least one of said electronic components, and machining the front and/or back surface of the lens blank to produce a contact lens containing the at least one electronic component.

The invention provides, in a second aspect a rod of contact lens material for use in the manufacture of a contact lens, wherein a plurality of electronic components are incorporated into, and spaced apart along the length of, the rod.

The invention provides, in a third aspect, a contact lens production line for the manufacture of contact lenses including electronic components.

It will be appreciated that features described in relation to one aspect of the present invention can be incorporated into other aspects of the present invention. For example, features described with reference to the method of the invention may be incorporated into the apparatus, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the scope of the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Examples of the methods and apparatus of the present invention will now be described, by way of example only, with reference to the accompanying drawings, in which.

DETAILED DESCRIPTION

Embodiments are described herein in the context of improved methods and systems for the manufacture of contact lenses incorporating electronic components.

Those of ordinary skill in the art will realize that the following detailed description is illustrative only and is not intended to be in any way limiting. Other embodiments of the present invention will readily suggest themselves to such skilled persons having the benefit of this disclosure. Reference will be made in detail to implementations as illustrated in the accompanying drawings. The same reference indicators will be used throughout the drawings and the following detailed description to refer to the same or like parts.

As previously stated, a first aspect is directed to a method of manufacturing a contact lens. The method comprises manufacturing a rod of lens material, the rod containing a plurality of electronic components spaced apart along its length. The method further comprising separating the rod into a plurality of lens blanks. Each lens blank contains at least one of said electronic components. The method further comprises machining the front surface, the back surface, or both the front and back surfaces of a lens blank to produce a contact lens containing the at least one electronic component.

The lens material may be any contact lens material suitable for machining. The lens material may be a non-swelling material such as a rigid gas permeable material. Or, the lens material may be a hydrogel material, which includes a silicone hydrogel material.

The rod may comprise an elongate body. The rod may have a length that is very much greater than its diameter. For example, the length of the rod may be at least two times greater than the diameter of the rod. In some embodiments, the length of the rod is between two times and ten times greater than the diameter of the rod. The rod may have a circular, or near circular, cross section. It will be appreciated however that the rod need not necessarily have a circular, or near circular cross section. The diameter of the rod may be the required diameter of the lens.

The electronic component may be a microelectronic component. Each electronic component may form part of an electronic device, for example a microelectronic device or MEMS (Microelectomechanical Systems) device. The plurality of electronic components may include a sensor, an actuator, a battery, or a power harvesting device, such as a circuit that may utilize induction or radio waves to be charged. Thus, the rod may include a plurality of (micro) electronic devices spaced apart along its length. It will be appreciated that where features of the present embodiments are discussed in relation to an electronic component, those features may (where appropriate) equally involve an electronic device (and vice versa).

It may be that the contact lens is a rigid gas permeable contact lens. Thus, the method may be a method of manufacturing a rigid gas permeable (RGP) contact lens. Alternatively, the method may be a method of manufacturing a lathed hydrogel contact lens.

The method may comprise curing a lens precursor composition to produce the rod. The lens precursor composition may be a liquid composition. It may be that the method comprises immersing each electronic component within the liquid lens precursor composition. Immersing the electronic components (or devices) in the liquid lens precursor composition prior to curing may provide an improved way of incorporating the electronic component into a lens by, for example, reducing the risk of air pockets or voids forming around the electronic component which may impact on the optical characteristics of the final lens.

The lens precursor composition may be a polymerisable composition. The lens precursor composition may comprise a monomer mixture comprising polymerisable monomers and optionally polymerisable macromers, such as polysiloxane macromers. The precursor material may include one or more silicone-containing monomeric or macromeric component(s). For example, an acrylate or methacrylate monomer or macromer, such as a fluorosilicone (meth)acrylate. The (meth)acrylate monomer(s) and macromer(s) many be monofunctional having a single (meth)acrylate group or polyfunctional including more than one (meth)acrylate functional group. In addition, or alternatively, the polymerisable composition may comprise non-silicon-containing hydrophilic or hydrophobic monomers, such as hydroxyethyl methacrylate, methyl methacrylate, N-vinylpyrrolidone, N-vinyl acetamide, and the like.

The step of manufacturing the rod of lens material may comprise curing a quantity of liquid lens precursor composition containing an electronic component in a mold. In some embodiments, the mold is in the shape of a cylinder. The curing may be accomplished by exposing the mold containing the lens precursor composition to heat or light, including ultraviolet light. In some methods, the mold is made of a plastic material, such as polypropylene, and the liquid lens precursor composition located in the plastic mold is exposed to heat to cause polymerization of the lens precursor composition. In other methods, the mold can be made of quartz or other materials that allow passage of ultraviolet light to cause polymerization of the lens precursor composition in the mold.

The step of manufacturing the rod of lens material may comprise producing a first length of the rod including a first one of the plurality of electronic components and then producing a second length of the rod, said second length including a second one of the plurality of electronic components. Thus, the method may comprise producing a first length of the rod, then producing a second length of the same rod. The second length may be bonded to the first length at one end. The method may comprise producing one or more further lengths of the same rod, each length including an electronic component and being bonded to a previous length at one end. Thus, the rod may be built-up in a plurality of stages, each stage including an electronic component. Producing the rod in stages may facilitate the commercial scale manufacture of lenses containing electronic components.

Producing each length of the rod may comprise locating an electronic component within the mold, covering the electronic component with a portion of liquid lens precursor composition and then at least partially curing said portion of liquid lens precursor composition.

The step of locating the electronic component within the mold may comprise placing the electronic component at a predetermined position and/or in a predetermined orientation within the mold. The predetermined position may be adjacent to, for example resting on, a quantity of lens material already present in the mold (for example liquid lens precursor composition that has previously been cured). Thus, in the case that the method comprises building up the rod in a series of lengths, the step of locating the electronic component may comprise resting the electronic component on top of a previously produced length. The predetermined position may comprise a central position, concentric with the longitudinal axis of the mold. The predetermined position may comprise a position outside a central zone, the central zone corresponding to an optic zone of the contact lens ultimately produced from the rod. The step of locating the electronic component may comprise placing the electronic component in the same orientation as an electronic component already present in the mold (for example encapsulated in lens material present in the mold).

The step of covering the electronic component with a portion of liquid lens precursor composition may comprise dispensing a predetermined quantity of lens precursor into the mold. It may be that, when covered, the electronic component is immersed within (e.g. surrounded by) the liquid lens precursor composition. Thus, it may be that once the liquid lens precursor composition is cured, the electronic component is included within the rod.

The method may include only partially curing each length of rod before forming the next length. In the case that each length of the rod is only partially cured when first produced, the method may further comprise a final cure in which the curing process is completed for more than one of, for example all of, the lengths of a rod simultaneously. The final cure may comprise curing the whole rod. Alternatively, each length of rod may be fully cured before work begins on forming the next length. Curing (or partially curing) the lens precursor composition may comprise exposing the mold to conditions, for example a level of thermal or ultraviolet radiation, effective to polymerize the lens precursor composition.

Materials suitable for the production of the mold may include thermoplastic polyolefin resins. Any suitable thermoplastic polyolefin resin or mixture of such resins may be employed in the production of the mold provided that such resin or resins yield a mold suitable for producing a rod of lens material for use in the production of high quality contact lenses. Examples of such thermoplastic polyolefin resins include thermoplastic polyethylene resins, thermoplastic polypropylene resins, thermoplastic polystyrene resins, and the like and mixtures thereof. The presently useful thermoplastic polyolefin resins can be made in any suitable manner, for example, using conventional and well known processing. The mold may be injection molded from the thermoplastic polyolefin resin or mixture of resins by methods which are well known in the art.

The mold may comprise a tubular cavity in which the rod is formed. The mold may comprise a tube.

The polymerized rod may be removed by the tubular mold in various ways. For example, if the mold is made of a plastic, such as polypropylene, the mold can be cut along its length to allow the mold to be pryed open to permit removal of the polymerized rod. Or, the mold can be sliced orthogonally to the length of the tube in one or more segments which permit segments of the polymerized rod to be exposed, and the remaining portion of the polymerized rod to remain in the tubular mold. The molding material can be separated away from the polymerized rod segments mechanically, or the polymerized rod segments can be lathed into contact lenses, as described herein, with the molding material attached during the initial lathing steps, and the molding material will be lathed away with the excess polymerized rod material. If the mold is made from quartz or other similarly rigid material, the mold can be cracked or split open mechanically to allow removal of the polymerized rod.

The process of separating the rod into one or more lens blanks (also known as buttons) may comprise cutting, for example cutting using a blade or a laser. Cutting the rod into lens blanks may comprise cutting between electronic components and/or devices, for example between each electronic component and/or device. A lens blank may comprise more than one electrical device. The or each electrical device may be located centrally (axially and/or radially) in the lens blank. The or each electronic component and/or device may be located closer to one end of the lens blank that the other. The step of separating the rod into lens blanks may comprise removing the end portions of the rod and then separating the remaining portion of the rod into a plurality of lens blanks each of which incorporates an electronic component.

In the case that the rod is cast in stages, it will be appreciated that there will be a joining region (which may be invisible) where two stages meet. The method may comprise the step of separating the rod at a location spaced apart from each joining region. The electronic component may be located in the joining region.

The method may comprise machining the front and/or back surface of a lens blank to produce a contact lens having a predetermined profile. The method of machining the lens blank may comprise lathing the lens blank. It will be appreciated that other production steps may be required after the machining step in order to produce a finished contact lens.

The electronic component may form part of a curved electronic device. The method may comprise the step of matching the curve of an electronic component (or the device of which it forms a part) and the base curve of the lens to be manufactured such that the component remains encapsulated within the lens material after the machining of the lens blank is completed. It will be appreciated that matching the curve of the component and the lens does not require the two curvatures to be identical. Thus, the method may comprise the step of providing a curved electronic component, wherein the curvature of the electronic component is similar to the base curve of the finished lens.

Thus, in accordance with the foregoing methods, a lathed contact lens is produced that includes one or more electronic components. If the rod is sufficiently long, a plurality of lathed contact lenses can be produced, wherein each lathed contact lens includes one or more electronic components.

The second aspect provides a rod of contact lens material for use in the manufacture of a contact lens. A plurality of electronic components are incorporated into, and spaced apart along the length of, the rod. The electronic components may be embedded within the lens material that forms the rod. The electronic component may be embedded within the lens material such that the devices are completely contained within the rod. The rod may comprise two, four, six, eight, ten or more than ten electronic components spaced apart along its length.

The rod of contact lens material may be suitable for use in the production of a RGP contact lens. Or, the rod of contact lens material may be suitable for use in the production of a lathed hydrogel contact lens or silicone hydrogel contact lens.

The electronic components may be spaced apart at regular intervals along the length of the rod. The electronic components may be regularly, for example equidistantly, spaced along the longitudinal axis of the rod. Each electronic component may be spaced apart from any other electronic component along the longitudinal axis of the rod. The longitudinal separation of the components may be at least 2 mm, at least 3 mm, at least 4 mm, at least 5 mm. It may be that the longitudinal separation is not more than 10 mm, preferably not more than 7 mm. The diameter of the rod will be equal to or larger than the diameter of the lenses being produced. A typical lens diameter is 14 mm.

The rod may comprise two end portions, each end portion being located at an end of the rod. The rod may comprise a central portion extending along the length of the rod between the two end portions. The plurality of electronic components may be located within the central portion of the rod. It may be that no electronic components are located in the end portions of the rod. The plurality of electronic components may be spaced apart, for example regularly (for example equidistantly) spaced apart along the length of the central portion of the rod.

Each of the plurality of electronic components (or any electronic device of which they form a part) may be curved. For example an electronic device or component may have a domed shape. An electronic device or component may be in the form of an annulus.

The contact lens of the present disclosure is understood to include any ophthalmic lens that can be worn directly on the eye. A contact lens according to the present disclosure may be a corrective contact lens, for example, used to treat a condition selected from myopia, hyperopia, astigmatism, presbyopia, and color deficiencies. Alternatively or additionally a contact lens may be cosmetic, i.e. designed to change the appearance, for example, the color, of the eye. Alternatively or additionally, a contact lens of the present disclosure may be a therapeutic contact lens, for example, a contact lens used to protect a damaged or diseased cornea. A contact lens of the present disclosure may be a sensor, for example to monitor the health of the wearer. It will be appreciated that, with appropriate modification, the present methods may also be useful for the manufacture of other types of ophthalmic lenses.

A further aspect of the invention provides a production line for manufacturing contact lenses according to any other aspect. It will be appreciated that a manufacturing line for producing contact lenses in accordance with the present invention can comprise multiple stations. For example, the system can include one or more of a rod production station, rod cutting station and lens blank machining station. The rod production station may comprise apparatus arranged to assemble the mold. The rod production station may comprise apparatus arranged to place an electronic component within the mold. The rod production station may comprise apparatus arranged to deliver a predetermined quantity of liquid lens precursor composition to the mold. The rod production station may comprise apparatus arranged to cure a predetermined quantity of lens precursor composition. The rod production station may comprise apparatus arranged to move a mold between the various apparatus (for example between the apparatus for placing an electronic component, delivering a predetermined quantity of lens precursor composition and/or curing said material) in order to build up the rod in a plurality of stages as described in any other aspect of the invention. The rod cutting station or rod production station may comprise apparatus arranged to demold the rod of lens material from the mold. The rod cutting station may comprise apparatus arranged to separate, for example cut, the rod into a plurality of lens blanks, each lens blank comprising an electronic component. The lens blank machining station may comprise apparatus, for example a lathe, for machining the lens blank to produce a contact lens having a predetermined profile.

Figure 1:
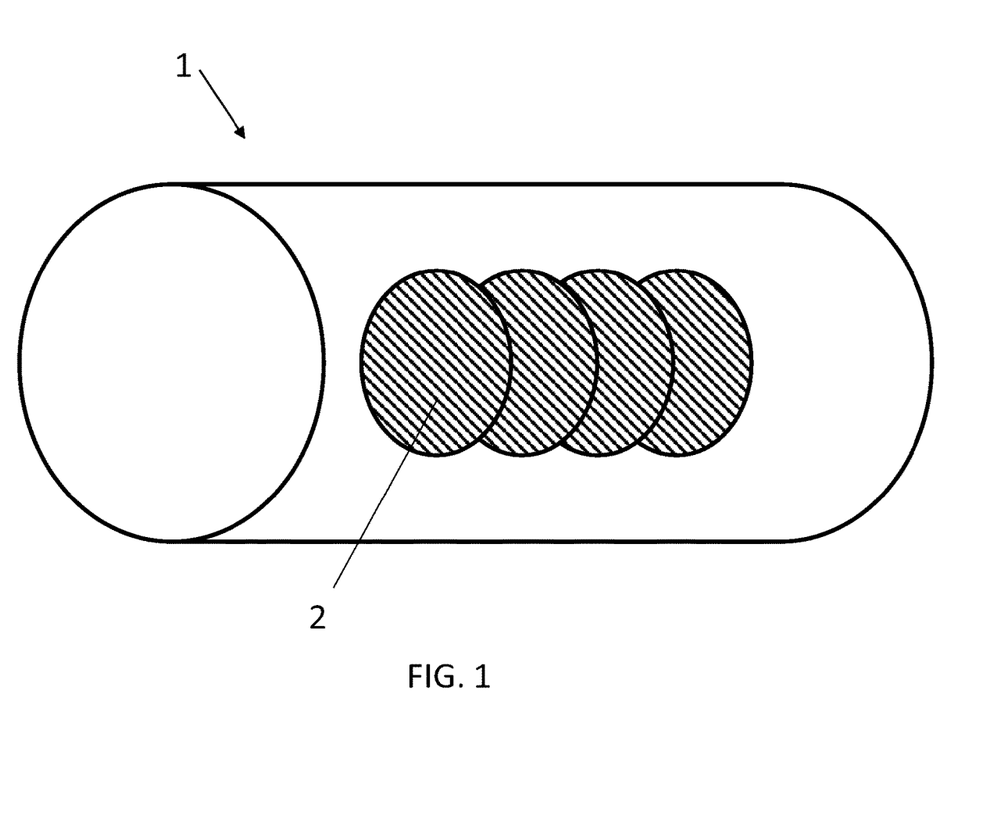
FIG. 1 is a schematic view of a rod of contact lens material in accordance with a first example embodiment.

With reference to the drawings, FIG. 1 shows a schematic view of a rod 1 of lens material in accordance with a first example embodiment. The rod has a circular cross section and incorporates four electronic devices 2. The electronic devices 2 are spaced equidistantly apart along the longitudinal axis of the rod 1. Located adjacent to each end of the rod 2 is a region within which no electronic devices are located.

Figure 2:
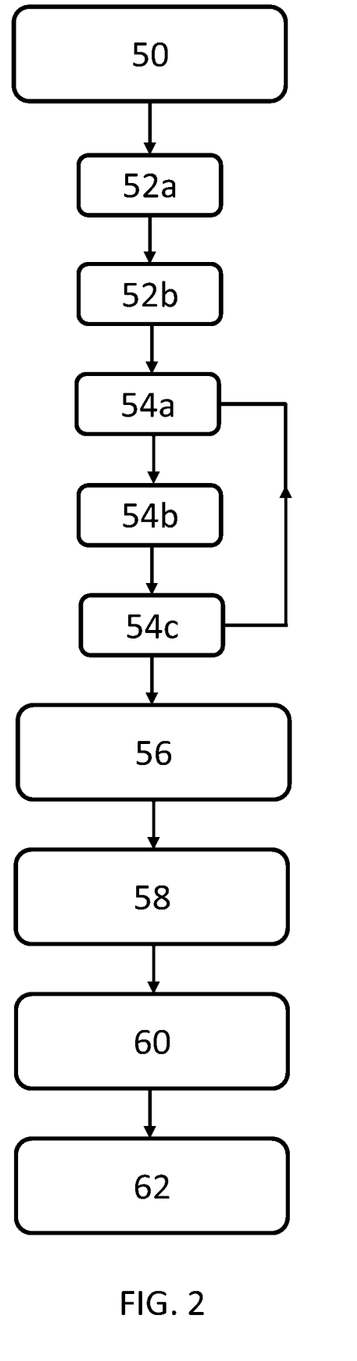
FIG. 2 is a flow chart showing a method of manufacturing a contact lens in accordance with a first example method.

FIG. 2 shows a flow chart of an example method of manufacturing a contact lens. In a first step a tubular mold having a diameter corresponding to the diameter of the finished contact lens is assembled 50. To produce the rod a predetermined quantity of liquid lens precursor composition is first poured 52a into the mold while the mold is held upright. The lens precursor composition is then heat cured 52b to form a solid end portion of the rod. The remainder of the rod is then built-up in stages by repeating a process of (i) placing 54a an electronic device on top of the previously cured portion of rod, (ii) covering 54b that electronic device with liquid lens precursor composition and (iii) curing 54c that liquid lens precursor composition. The process of 'placing' 54a, 'pouring' 54b and 'curing' 54c is repeated for each electronic device. By using the same quantity of liquid lens precursor in each stage, methods in accordance with the present example may result in a rod having a plurality of electronic devices equidistantly spaced apart along its length. Provided a sufficient quantity of lens precursor composition is used, the final stage will also produce a second end portion of the rod in which no electronic devices are located.

Once the lens precursor composition of the final stage is cured 54c the resulting rod of lens material, with the regularly spaced devices encapsulated therein, is removed 56 from the mold. The (electronic device-free) end portions of the rod are cut off 58, leaving the central portion of the rod incorporating the electronic devices. The central portion of the rod is then cut into buttons 60, each button including a device. Each button is then lathed 62 to produce a contact lens having a profile corresponding to a particular prescription. As described herein, in some embodiments, the contact lens is an RGP contact lens. However, in other embodiments, the contact lens is a lathed hydrogel contact lens or a lathed silicone hydrogel contact lens.

Figure 3A:
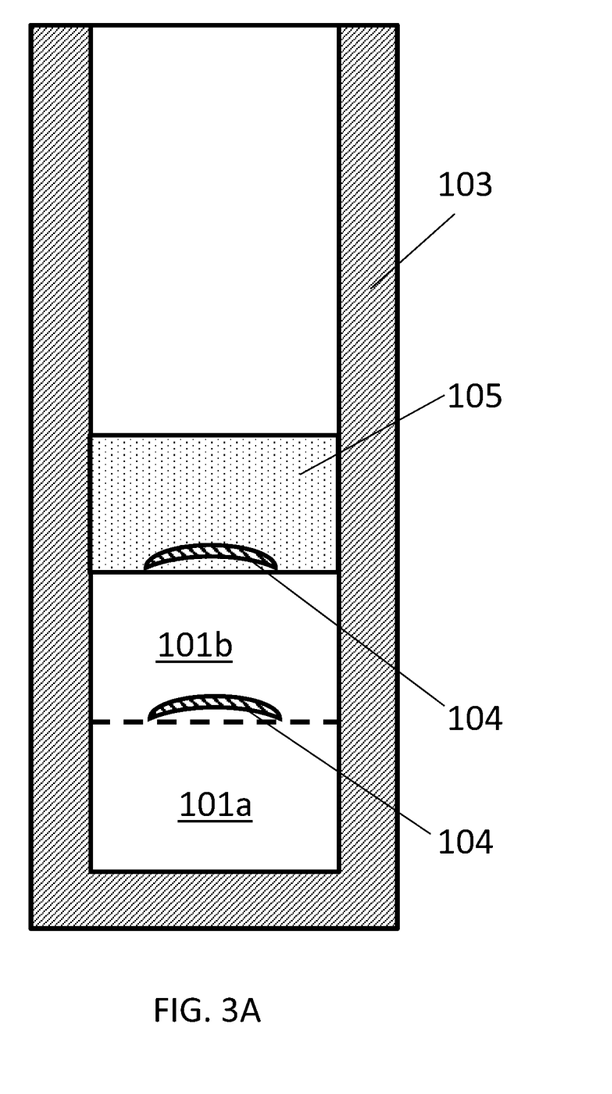
FIGS. 3A, 3B, 3C, and 3D show a contact lens and its precursor products at various stages of manufacture in accordance with a second example embodiment.
Figure 3B:
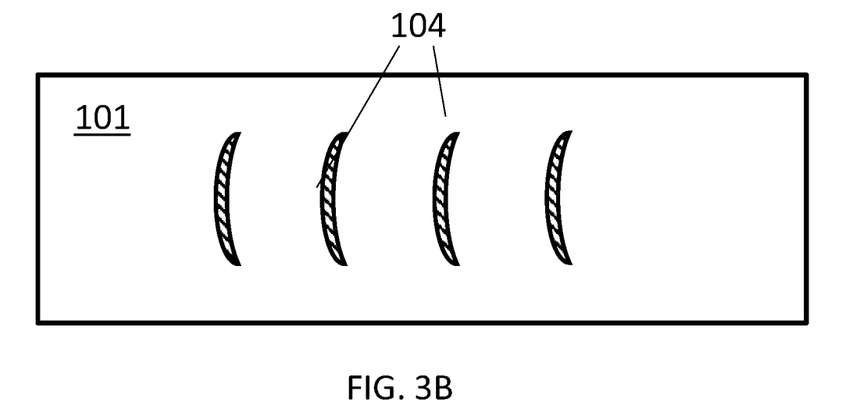
Figure 3C:
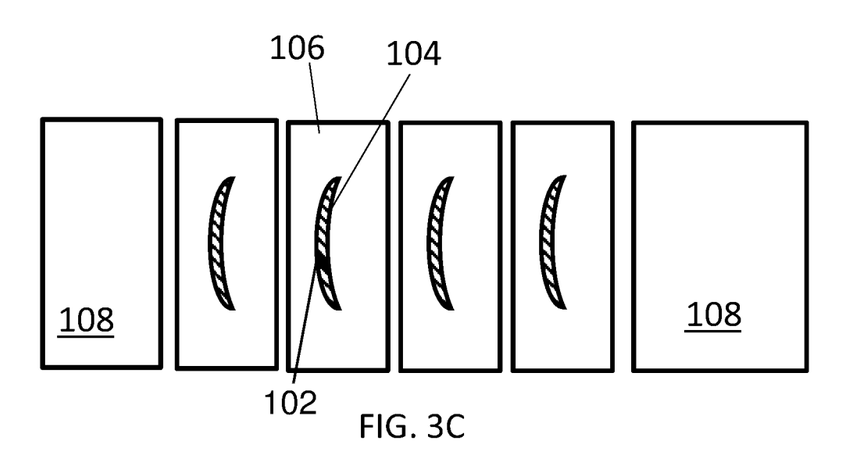
Figure 3D:
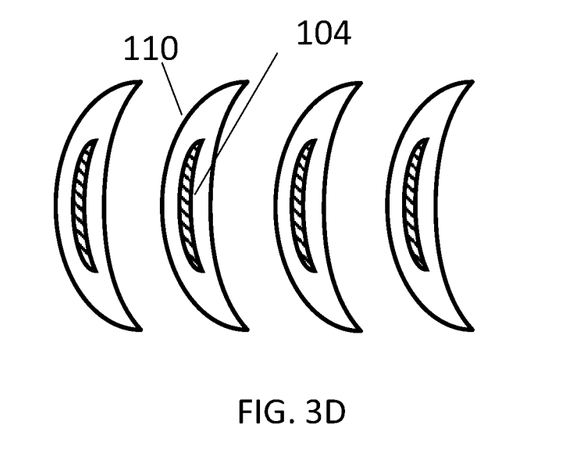

FIGS. 3A, 3B, 3C, and 3D show the contact lens and its precursor products at various stages of manufacture. In FIG. 3A, a cross-sectional view of a length of a rod 101 in a tubular mold 103 is shown. In FIG. 3A, dashed lines are used to indicate the notional boundary between each length of rod. A first, cured, length of the rod 101a is located at the bottom end of the mold 103. A second, cured, length of the rod 101b is located on top of the first length 101a and includes a first electronic device 104, which is located at the boundary between the first 101a and second 101b lengths of the rod. A second electronic device 104 is resting on top of the second length 101b, and has been covered by a layer of liquid precursor composition 105. Once cured, this layer of liquid precursor composition 105 will form a third length 101c of rod 101. In FIG. 3B, a cross-sectional view of the finished rod 101 including four curved electronic devices 104 is shown (it will be appreciated that a rod may include many more than four electronic devices). Each device 104 includes an electronic component 102 (not shown in FIGS. 3A-3D). FIG. 3C shows a cross-section view of the rod 101 after the rod 101 has been cut into four buttons 106, each button 106 containing an electronic device 104, and two end portions 108, the end portions 108 not containing any electronic devices 104. FIG. 3D shows a cross sectional view of the four contact lenses 110 produced from the rod 101, each lens 110 including an electronic device 104, after the front and back of the button 106 have been machined to produce a required optical profile.

Figure 4:
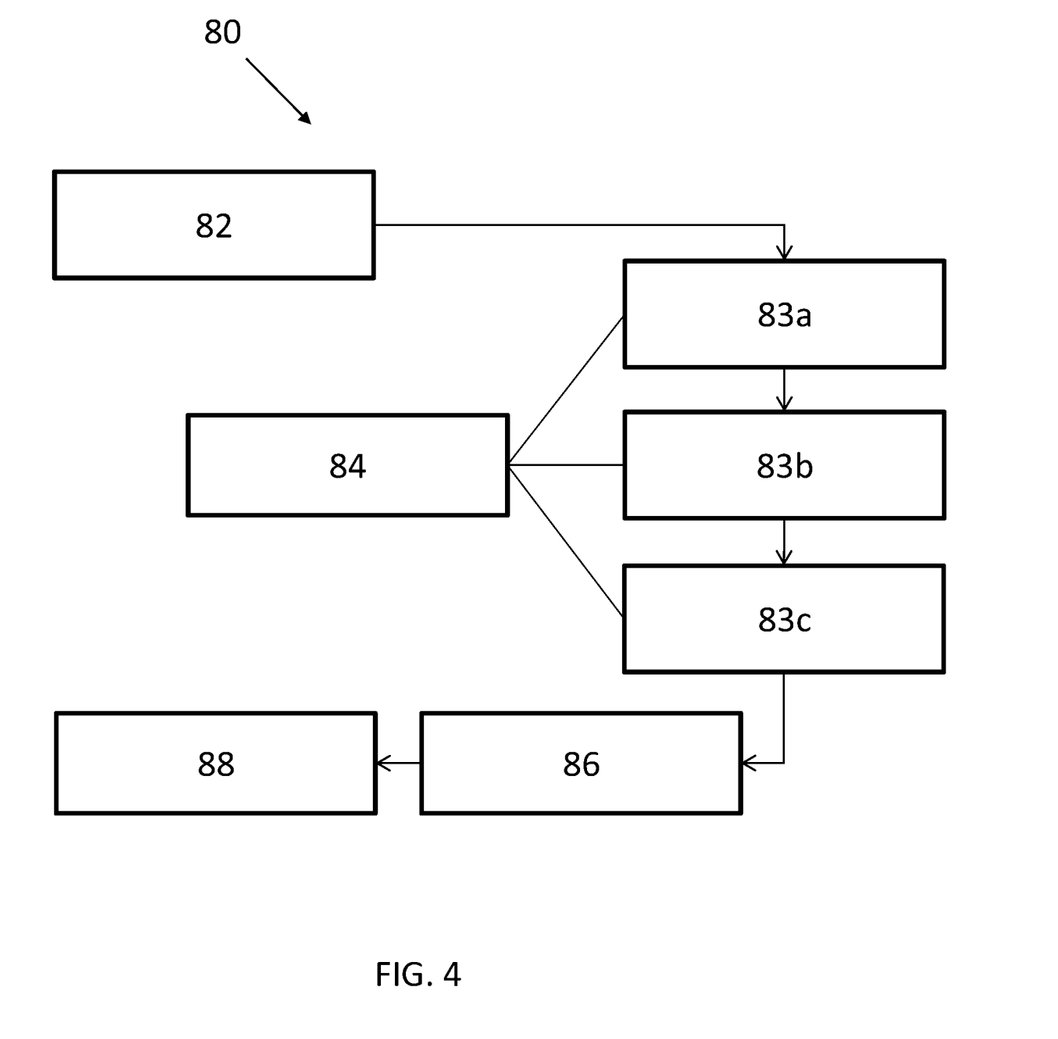
FIG. 4 shows a contact lens production line in accordance with a third example embodiment.

FIG. 4 shows a schematic view of a contact lens production line 80 in accordance with the present invention. The production line comprises a rod mold assembly station 82 at which the tubular mold is assembled 50 (see FIG. 2). The rod molding station comprises a placement sub-station 83a, at which an electronic device is placed in a mold 54a, a filling sub-station 83b at which liquid lens precursor composition is poured into the mold 52a, 54b and a curing sub-station 83c at which the liquid lens precursor composition is cured 52b, 54c. The rod molding station further comprises handling apparatus 84 which transfers a mold between the placement 83a, filling 83b and curing 83c sub-stations in a repeating cycle. The production line also comprises a demolding and machining station 86 at which the rod is removed 58 from the mold, the ends of the rod are cut off and discarded 60 and the central portion of the rod is cut into buttons 62. The line also comprises a lathing station 88 at which the lens blanks are lathed 64 to produce a contact lens.

While the present invention has been described and illustrated with reference to particular embodiments, it will be appreciated by those of ordinary skill in the art that the disclosure lends itself to many different variations not specifically illustrated herein.

The present disclosure is described herein with respect to the manufacture of contact lenses. It will be appreciated that, with appropriate modification, the present methods and apparatus may be useful for the manufacture of other types of ophthalmic lenses.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the invention, may not be desirable, and can therefore be absent, in other embodiments.

The invention claimed is:

1. A method of manufacturing a contact lens, the method comprising manufacturing a rod of lens material, the rod containing a plurality of electronic components spaced apart along its length, separating the rod into at least one lens blank containing at least one of said plurality of electronic components, and machining the front and/or back surface of the at least one lens blank to produce a contact lens containing the at least one of the plurality of electronic components, wherein manufacturing the rod of lens material comprises producing the rod in at least two separate stages, wherein in a first stage, producing a first length of the rod including a first one of the plurality of electronic components and then in a second stage, producing a second length of the rod, said second length including a second one of the plurality of electronic components.

2. A method according to claim 1, wherein the contact lens is a rigid gas permeable contact lens, a hydrogel contact lens, or a silicone hydrogel contact lens.

3. A method according to claim 1, wherein manufacturing the rod of lens material comprises curing a quantity of liquid lens precursor composition containing an electronic component in a mold.

4. A method according to claim 1, wherein producing each length comprises locating an electronic component within the mold, covering the electronic component with a portion of liquid lens precursor composition and then at least partially curing said portion of liquid lens precursor composition.

5. A method according to claim 4, wherein the step of locating the electronic component within the mold includes resting the electronic component on top of a previously produced length of the rod.

6. A method according to claim 1, wherein the mold comprises a tube.

7. A method according to claim 1, wherein the electronic component forms part of a curved electronic device.

8. The method according to claim 1, wherein the producing of the first length comprises placing the first one of the plurality of electronic components into a mold, covering the first one of the plurality of electronic components with a first portion of a liquid lens precursor composition, and then at least partially curing said first portion of the liquid lens precursor composition and producing the second length comprises resting the second one of the plurality of electronic components on the first length, covering the second one of the plurality of electronic components with a second portion of the liquid lens precursor composition, and then at least partially curing said second portion of the liquid lens precursor composition.

* * * * *